United States Patent
Teo et al.

(10) Patent No.: US 11,422,576 B2
(45) Date of Patent: Aug. 23, 2022

(54) MODULAR POWER SUPPLY UNIT

(71) Applicant: HEWLETT PACKARD ENTERPRISE DEVELOPMENT LP, Houston, TX (US)

(72) Inventors: Poh Boon Teo, Singapore (SG); Chi Hock Goh, Singapore (SG)

(73) Assignee: Hewlett Packard Enterprise Development LP, Houston, TX (US)

( * ) Notice: Subject to any disclaimer, the term of this patent is extended or adjusted under 35 U.S.C. 154(b) by 104 days.

(21) Appl. No.: 17/005,697

(22) Filed: Aug. 28, 2020

(65) Prior Publication Data

US 2022/0066486 A1 Mar. 3, 2022

(51) Int. Cl.
*G05F 1/46* (2006.01)
*G05F 1/577* (2006.01)
*G05F 1/565* (2006.01)
*H02H 9/02* (2006.01)

(52) U.S. Cl.
CPC ............ *G05F 1/46* (2013.01); *H02H 9/02* (2013.01); *G05F 1/462* (2013.01); *G05F 1/565* (2013.01); *G05F 1/577* (2013.01)

(58) Field of Classification Search
CPC .......... G05F 1/462; G05F 1/465; G05F 1/563; G05F 1/565; G05F 1/577; H02M 3/156; H02M 3/157

See application file for complete search history.

(56) References Cited

U.S. PATENT DOCUMENTS

| | | | |
|---|---|---|---|
| 6,448,672 B1 | 9/2002 | Voegeli et al. | |
| 6,751,740 B1 * | 6/2004 | Robertson | G11C 5/143 |
| | | | 713/340 |
| 7,812,479 B1 * | 10/2010 | Menas | H01R 13/66 |
| | | | 307/31 |
| 8,386,806 B2 | 2/2013 | Ooi et al. | |
| 10,089,270 B2 * | 10/2018 | Mooney | G06F 13/385 |

(Continued)

FOREIGN PATENT DOCUMENTS

| | | |
|---|---|---|
| CN | 101840260 B | 2/2012 |
| CN | 103645791 A | 3/2014 |

(Continued)

*Primary Examiner* — Gary A Nash
(74) *Attorney, Agent, or Firm* — Hewlett Packard Enterprise Patent Department

(57) ABSTRACT

Examples described herein relate to modular power supply unit. The modular power supply unit may include an output connector through which the modular power supply unit is removably connectible to a host circuit board. The output connector includes ID pins to receive signals indicative of a power demand corresponding to the host circuit board. Further, the modular power supply unit may include a voltage regulator to output an electrical power at a plurality of power settings. Moreover, the modular power supply unit may include control unit coupled to the output connector and the voltage regulator. The control unit may determine a power demand code based on the signals received at the one or more ID pins; identify a power setting, from the plurality of power settings, based on the determined power demand code; and cause the voltage regulator to generate the electrical power at the identified power setting.

20 Claims, 5 Drawing Sheets

(56) References Cited

U.S. PATENT DOCUMENTS

| | | | |
|---|---|---|---|
| 2011/0169331 A1* | 7/2011 | Gill | H02J 1/001 307/28 |
| 2012/0329509 A1* | 12/2012 | Ravichandran | G06F 1/26 455/572 |
| 2013/0221944 A1* | 8/2013 | Cheng | H02M 3/157 323/318 |
| 2013/0311795 A1 | 11/2013 | Cong et al. | |
| 2015/0089253 A1* | 3/2015 | Doering | H02M 3/156 713/300 |
| 2016/0378175 A1* | 12/2016 | Wu | G06F 1/3296 713/320 |
| 2018/0115237 A1* | 4/2018 | Morin | H02J 13/00016 |
| 2018/0247678 A1* | 8/2018 | Vergis | G11C 5/147 |
| 2019/0189182 A1* | 6/2019 | Connolly | G11C 11/4074 |
| 2019/0258832 A1* | 8/2019 | Jung | H02M 3/158 |

FOREIGN PATENT DOCUMENTS

| | | | |
|---|---|---|---|
| CN | 106527226 A | 3/2017 | |
| WO | WO-0039907 A1 * | 7/2000 | G01K 1/02 |
| WO | WO-2011051719 A2 * | 5/2011 | G06F 1/26 |

\* cited by examiner

MODULAR POWER SUPPLY UNIT

BACKGROUND

Electronic devices, for example, servers, desktop computers, edge computing devices, and/or portable computing devices may include several electronic components disposed on one or more circuit boards. The circuit boards may receive power to enable functioning of the electronic components from one or more power supply circuits.

BRIEF DESCRIPTION OF THE DRAWINGS

These and other features, aspects, and advantages of the present specification will become better understood when the following detailed description is read with reference to the accompanying drawings in which like characters represent like parts throughout the drawings, wherein.

Figure 1:
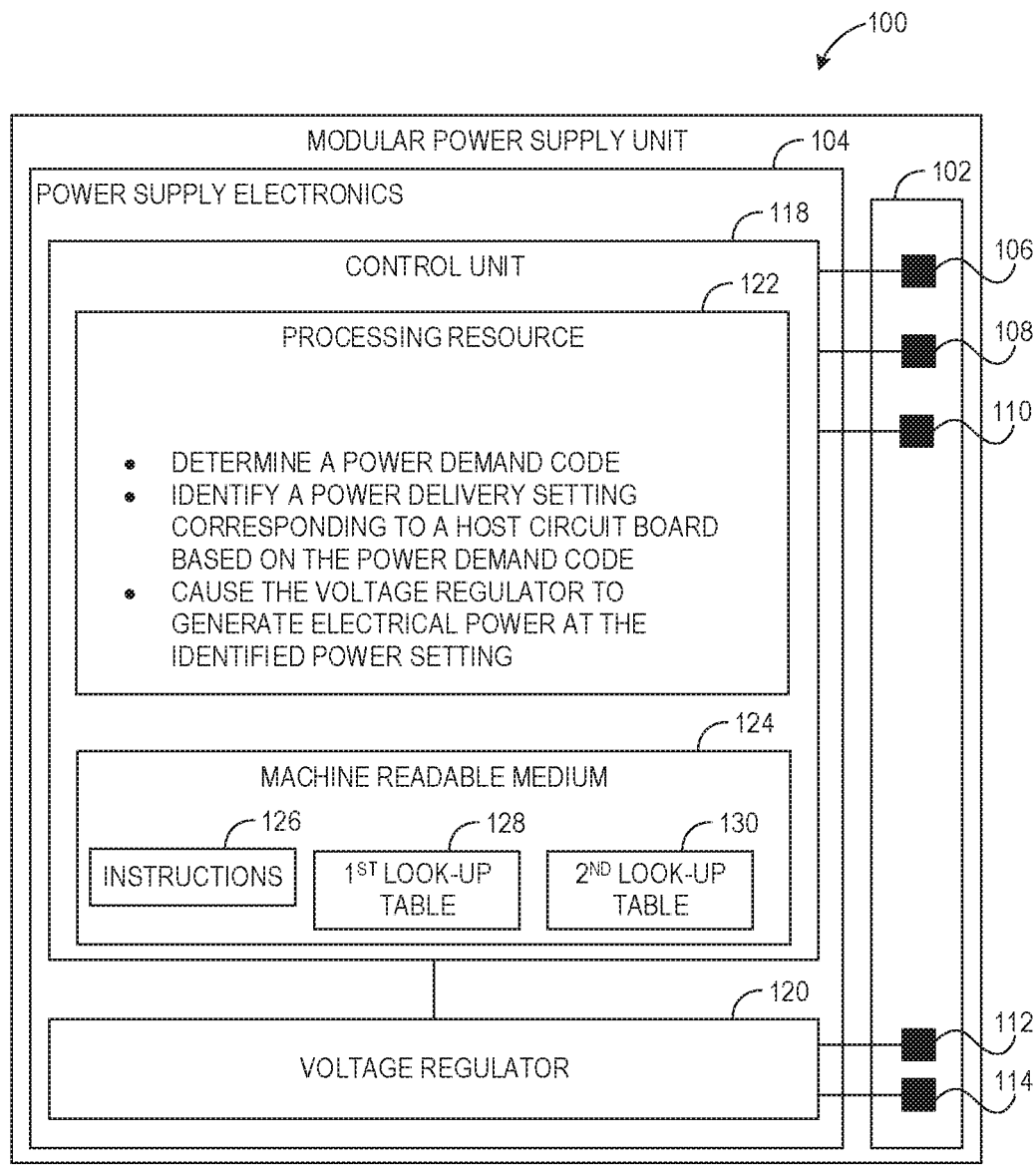
FIG. 1 depicts a block diagram of a modular power supply unit, in accordance with an example.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements may be coupled mechanically, electrically, magnetically, or communicatively linked through a communication channel, pathway, network, or system. Further, the term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

Electronic devices, for example, servers, desktop computers, edge computing devices, and/or portable computing devices may include several electronic components disposed on one or more circuit boards. The circuit boards may receive power to enable functioning of the electronic components from one or more power supply circuits.

A power supply circuit may be disposed on a circuit board in an electronic device. The power supply circuit may receive mains power (e.g., the utility electricity) and convert the received mains power into a DC power usable by various electronic components directly or after being regulated by a voltage regulator, for example. The power supply circuit may generally include a transformer, a rectifier, a power filter, and a voltage regulator. The transformer is employed in the power supply circuit to step-down supply voltage (e.g., voltage of the mains power) to a reduced voltage level. Further, the rectifier may be coupled to the transformer to receive the stepped-down AC voltage from the transformer and convert the received AC voltage into a DC voltage. Further, the power filter may be coupled to the rectifier to receive the DC voltage and remove ripples from the incoming DC voltage thereby outputting a filtered DC voltage with the reduced ripples/distortions. Furthermore, the filtered DC voltage may be supplied to the voltage regulator. The voltage regulator may generate a regulated voltage based on incoming filtered DC voltage. The regulated voltage generated by the voltage regulator may be consumed by various electronic components disposed on the circuit board.

Conventionally, the electronic components of the power supply circuits are either disposed on the circuit boards or the power supply circuits are permanently attached to the circuit boards of the electronic devices. Further, the power supply circuits are typically designed to output electrical power at a fixed voltage that is suitable for the circuit boards to operate. Disadvantageously, such power supply circuits are not usable with other electronic devices or other circuit boards. Also, if an electronic device fails or gets damaged, even though the respective power supply circuit may be capable of being operated, the power supply circuit may not be readily removable and usable with other circuit boards as the power supply circuit is permanently attached to the circuit board. Moreover, since the power supply circuit is designed to generate a fixed power output, such power supply circuit may not be usable with other circuit boards that operate at a different input power than the power output of the power supply circuit.

In accordance with aspects of the present application, a modular power supply unit is presented. The modular power supply unit, in some examples, can be removably connectible to various host circuit boards that operate at different power settings. In some examples, the modular power supply unit may include an output connector through which the modular power supply unit is removably connectible to a host circuit board that is separate from the modular power supply. The output connector may include one or more identity detection (ID) pins to receive signals indicative of a power demand corresponding to the host circuit board. Further, the modular power supply unit may include a voltage regulator to output an electrical power at one or more of a plurality of power settings. Moreover, the modular power supply unit may include control unit coupled to the output connector and the voltage regulator. The control unit may determine a power demand code based on the signals received at the ID pins. Further, the control unit may identify a power setting, from the plurality of power settings, corresponding to the host circuit board based on the determined power demand code and cause the voltage regulator to generate the electrical power at the identified power setting.

As will be appreciated, the modular power supply unit, in accordance with various examples presented herein, is capable of generating the electrical power that suits the power demand of the host circuit board. This is achieved, at least partially, by designing the output connector of the modular power supply unit to have the ID pins through which the control unit of the modular power supply unit senses the power demand of the host circuit board and determines a power demand code corresponding to the host circuit board. Based on the determined power demand code, the control unit instructs the voltage regulator to generate the electrical power at a power setting that matches the power demand of the host circuit board. As will be appreciated, such modular power supply unit can be removably connected to different host circuit boards that may require different power for respective operations. By detecting the power demand of the connected host circuit board, the modular power supply unit may dynamically generate the electrical power at a power setting corresponding to the power demand of the connected host circuit board. Moreover, since the modular power supply unit is removable from the host circuit board, the modular power supply unit can be detached from the host circuit board at any given time and can be removably connected to another host circuit board. Moreover, the modular power supply unit may be reused with other host circuit boards in the event that there is any malfunction, failure, or damage to the host circuit board to which the modular power supply unit was earlier connected.

Referring now to the drawings, in FIG. 1, a block diagram of a modular power supply unit 100 is depicted, in accordance with an example. In accordance with aspects of the present disclosure, the modular power supply unit 100 may output an electrical power at one or more of several voltage and/or current levels. Moreover, the modular power supply unit 100 may be removably connectible to a host circuit board (see FIG. 4) that may utilize the electrical power for its operation. The host circuit board may be separate from the modular power supply unit 100 and includes several electronic components disposed thereon, one or more of which may operate using the electrical power received from the modular power supply unit 100. In some examples, one more such host circuit boards may be disposed in any electronic device including, but not limited to, a computer, a server, a storage device, a network switch, a router, a mobile communication device, a desktop computer, a portable computer, an edge-computing device, or a WLAN access point.

In certain examples, the modular power supply unit 100 may be removably connectible to various host circuit boards that operate at different power settings and is capable of outputting the electrical power as required by the host circuit board to which the modular power supply unit 100 is connected. The modular power supply unit 100 may be removably connectible to the host circuit board via a removable connection between the modular power supply unit 100 and the host circuit board. The term removable connection as used herein may refer to a coupling arrangement between two components (e.g., the modular power supply unit 100 and the host circuit board) that allows the coupled components to be decoupled and coupled again when desired.

The modular power supply unit 100 may include an output connector 102 and a power supply electronics 104. The modular power supply unit 100 may be removably connectible to the host circuit board via the output connector 102. In some examples, the output connector 102 may include one or more identity detection (ID) pins 106, 108, and 110, hereinafter collectively referred to as ID pins 106-110. In the example power supply unit 110 presented in FIG. 1, three ID pins 106-110 are shown for illustration purposes. Use of any number of ID pins is envisioned within the purview of the present disclosure. In some examples, a number of the ID pins may be chosen depending on a number of power settings at which the modular power supply unit 100 is designed to output the electrical power. The term "power setting" as used herein may refer to characteristics configuration of the electrical power that is outputted by the modular power supply unit 100 including but not limited to, magnitude, phase, and/or frequency of one or both of voltage and current. For example, if the modular power supply unit 100 is designed to output the electrical power at four different DC voltage levels, the output connector 102 may be designed to have two ID pins. Similarly, in another example (as shown in FIG. 1), if the modular power supply unit 100 is designed to output the electrical power at eight different DC voltage levels, the output connector 102 may be designed to have three ID pins 106-110.

Further, to enable the connection with the modular power supply unit 100, in some examples, the host circuit board may include a receiving connector (see FIG. 4) that is removably connectible to the output connector 102 of the power supply unit 100. The receiving connector on the host circuit board may include one or more power demand indication (PDI) pins connectible to the one or more ID pins in the output connector 102. Additional details of the receiving connector is described in conjunction with FIG. 4. The host circuit board may cause a signal to appear on one or more of the PDI pins. The signals on the PDI pins may be indicative of a power requirement of the host circuit board. The signal appearing at each of the PDI pins may be a voltage signal or a current signal. In the description herein after, the signals appearing on the PDI pins are described as being DC voltage signals. However, in certain other examples, the signal may as well be any one of or combinations of the DC voltage, DC current, AC voltage, and AC current, without limiting the scope of the present application. During application, when the modular power supply unit 100 is connected to the receiving connector on the host circuit board, each of the ID pins 106-110 may be positioned in electrical contact with the respective ones of the PDI pins of the receiving connector. Accordingly, the ID pins 106-110 may receive signals (in examples hereinafter, DC voltages) indicative of the power demand corresponding to the host circuit board.

In some examples, the output connector 102 may include one or more output voltage terminals, such as, output voltage terminals 112 and 114 through which the modular power supply unit 100 outputs electrical power. When the modular power supply unit 100 is connected to the receiving connector on the host circuit board, the modular power supply unit 100 may supply the electrical power to the host circuit board via the output voltage terminals 112 and 114. In the description hereinafter, the modular power supply unit 100 is described as being designed to output DC power (e.g., DC voltage and DC current). Accordingly, one of the output voltage terminals 112 and 118 may be maintained at a positive potential while the other of the output voltage terminals 112 and 118 may be maintained at a negative potential. Although not shown, the modular power supply unit 100 may also be designed to output more than one voltage output. In such an implementation, the output connector 102 may also include additional pair/pairs of the output voltage terminals.

It may be noted that the terms "positive potential" and the "negative potential" are relative potentials. In other words, a given output terminal of two output terminals 112, 114 is said to be at the positive potential when a potential at the given output terminal is greater than a potential at the other output terminal of the two output terminals 112, 114. Similarly, the given output terminal of two output terminals 112, 114 is said to be at the negative potential when the potential at the given output terminal is lower than the potential at the other output terminal of the two output terminals 112, 114. In the description hereinafter, the output terminal 112 is defined as being at the positive potential and the output terminal 114 is defined as being at the negative potential. In certain other examples, the modular power supply unit 100 may be suitably designed to output AC power (e.g., AC voltage and AC current), without limiting the scope of the present disclosure.

Further, in some examples, the power supply electronics 104 may include a circuit arrangement of certain electronic components operable to generate the electrical power to be supplied to the output terminals 112 and 114 depending on the signals sensed at the ID pins 106-110. By way of example, the power supply electronics 104 may include a control unit 118 and a voltage regulator 120. In some examples, the control unit 118 may control the generation of the electrical power by the modular power supply unit 100. In particular, the control unit 118 may generate a power control command depending on the signals sensed at the ID pins 106-110 and transmit the power control command to the voltage regulator 120. The voltage regulator 120 may generate the electrical power based on the received power control command.

The voltage regulator (VR) 120 may output the electrical power at the output terminals 112, 114. In some examples, the voltage regulator 120 may generate a regulated voltage based on incoming power received from a voltage pre-processing circuit (not shown). In order to achieve such voltage regulation, the voltage regulator 120 may include one or more phase converters (not shown) and a VR controller (not shown). The phase converters may include a buck converter, a boost converter, or a buck-boost converter. In certain other examples, the phase converters may include any combination of the buck converter, the boost converter, or the buck-boost converter. The phase converters may include a plurality of electronic switches (e.g., semiconductor switches, not shown), switching of which may be controlled by the VR controller to cause the phase converters to convert the power received from the voltage pre-processing circuit into a power suitable for use by the host circuit board under the control of the control unit 118. The VR controller may include electronics (e.g., processor, microcontroller, or equivalent electronic circuits) to enable switching of the electronic switches in the phase converters, thereby causing the phase converters to operate. In certain examples, the voltage regulator 120 may be designed to output the electrical power at one or more of a plurality of power settings. For illustration purposes, the voltage regulator 120 is described as outputting the electrical power having DC voltages and DC currents of several different magnitudes depending on the signals received at the ID pins 106-110.

The control unit 118 is coupled to the output connector 102 and the voltage regulator 120. In some examples, the control unit 118 may be an electronic component that may include a processing resource and/or hardware/electronic circuits capable of generating the power control commands for the voltage regulator 120 based on the signals sensed at the ID pins 106-110. In one example, the control unit 118 may be a microcontroller. The control unit 118 may include a processing resource 122 and a machine-readable medium 124. The machine-readable medium 124 may be any electronic, magnetic, optical, or other physical storage device that may store data and/or executable instructions 126. For example, the machine-readable medium 124 may be a Random Access Memory (RAM), an Electrically Erasable Programmable Read-Only Memory (EEPROM), a storage drive, a flash memory, a Compact Disc Read Only Memory (CD-ROM), and the like. The machine-readable medium 124 may be non-transitory. As described in detail herein, the machine-readable medium 124 may be encoded with the executable instructions 126 to perform one or more methods, for example, methods described in FIGS. 5 and 6.

Further, the processing resource 122 may be a physical device, for example, one or more central processing units (CPUs), one or more semiconductor-based microprocessors, an application-specific integrated circuit (ASIC), a field programmable gate array (FPGA), other hardware devices capable of retrieving and executing instructions 126 stored in the machine-readable medium 124, or combinations thereof. In some examples, the microprocessors may include single processing core or multiple processing cores. The processing resource 122 may fetch, decode, and execute the instructions 126 stored in the machine-readable medium 124 to control the electrical power outputted by the modular power supply unit 100 based on the signals sensed at the ID pins 106-110. As an alternative or in addition to executing the instructions 126, the processing resource 122 may include at least one integrated circuit (IC), control logic, electronic circuits, or combinations thereof that include a number of electronic components for performing the functionalities intended to be performed by the control unit 118 (described further below).

In accordance with aspects of the present disclosure, the processing resource 122 in the control unit 118 may execute one or more of the instructions 126 to determine a power demand code based on the signals received at the one or more ID pins 106-110. Without limiting the scope of the ongoing description, the power demand code may be represented as a sequence of any numerals (e.g., 0-9), characters (A-Z), or words (e.g., high-low, positive-negative, etc.), or combinations thereof. For illustration purposes, in the description hereinafter, the power demand code is defined as being a binary code that is represented as being a sequence of ones (1s) and zeros (0s). The power demand code may have a bit representing signal on each of the ID pins 106-110.

In order to determine the power demand code, the processing resource 122 may evaluate the signal appearing at each of the ID pins 106-108 by comparing a parameter (e.g., voltage magnitude) of the signal with a threshold value. For example, for a given ID pin, the processing resource 122 may compare the magnitude of the signal appearing at the given ID pin. If the magnitude of the signal appearing at the given ID pin is determined to be greater than the threshold value, the processing resource 122 may set a bit corresponding to the given ID pin in the power demand code to 1. Alternatively, if the magnitude of the signal appearing at the given ID pin is determined to be lower than the threshold value, the processing resource 122 may set the bit corresponding to the given ID pin in the power demand code to 0. Table-1 presented below shows example power demand codes corresponding to different signals received at the ID pins 106-110 for an example threshold value of 2.5 volts.

TABLE 1

Example power demand codes

| Magnitude of Voltage at | | | | Power Demand Code | | |
|---|---|---|---|---|---|---|
| ID Pin 106 | ID Pin 108 | ID Pin 110 | Threshold Value | 1$^{st}$ Bit | 2$^{nd}$ Bit | 3$^{rd}$ Bit |
| 0.5 V | 4 V | 0.1 V | 2.5 V | 0 | 1 | 0 |
| 0.7 V | 1 V | 5 V | 2.5 V | 0 | 0 | 1 |
| 5 V | 5 V | 0 V | 2.5 V | 1 | 1 | 0 |

In the examples shown in Table-1, the power demand code is defined as being a three-bit binary code, where the first bit, second bit, and third bit of the power demand code may be determined based on the magnitudes of voltages at the ID pins 106, 108, and 110, respectively, and the threshold value. By way of example, corresponding to the magnitudes 0.5 V, 4 V, and 0.1 V at the ID pins 106, 108, and 110, the power demand code determined by the processing resource 122 may be 010.

Once the power demand code is determined, the processing resource 122 of the control unit 118 may execute one or more of the instructions 126 to identify a power setting corresponding to the host circuit board, from the plurality of power settings producible by the voltage regulator 120, based on the determined power demand code. In some examples, in order to identify the power setting, the control unit 118 may maintain a first mapping between a plurality of power demand codes and the plurality of power settings. In one example, the first mapping may be stored in the machine-readable medium 124 as a first look-up table 128. Table-2 presented below shows an example first look-up table 128 depicting an example mapping between the plurality of power demand codes and the plurality of power settings.

TABLE 2

Example first look-up table 128

| Power Demand Code | Power Setting |
|---|---|
| 010 | 8 A, 12 V |
| 001 | 10 A, 12 V |
| 110 | 12 A, 12 V |

As depicted in Table-2, the power demand code 010 may correspond to a power setting of 8 ampere and 12 volts. Similarly, the power demand code 001 may correspond to a power setting of 10 ampere and 12 volts. Further, the power demand code 110 may correspond to a power setting of 12 ampere and 12 volts. It may be noted that, for illustration purposes, Table-2 is shown to include the power settings corresponding to the power demand codes shown in Table-1. Depending on power output capability of the voltage regulator 120, additional power settings corresponding to additional power demand codes may also be stored in the first look-up table 128. Moreover, the power settings may also include different values of currents and voltages that are producible by the voltage regulator 120. During operation, once the power demand code is determined, the processing resource 122 may access the first look-up table 128 and identify the power setting corresponding to the determined power demand code. For example, for a given host circuit board, if the power demand code is determined as 010, the processing resource 122 may identify the power setting corresponding to the given circuit board as being 8 A and 12 V.

Further, in some examples, the processing resource 122 may execute one or more of the instructions 126 to cause the voltage regulator 120 to generate the electrical power at the identified power setting corresponding to the given host circuit board. In order to cause the voltage regulator 120 to generate the electrical power at the identified power setting, the processing resource 122 may transmit a power control command to the voltage regulator 120. The processing resource 122 may identify the power control command corresponding to the identified power setting, the processing resource 122 may maintain a second mapping between the plurality of power settings and corresponding power control commands. The second mapping may be stored in the machine-readable medium 124 as a second look-up table 130. Table-3 presented below shows an example second look-up table 130 depicting an example mapping between the plurality of power settings and corresponding power control commands.

TABLE 3

Example second look-up table 128

| Power Setting | Power Control Command |
|---|---|
| 8 A, 12 V | 001010 |
| 10 A, 12 V | 010010 |
| 12 A, 12 V | 100010 |

As depicted in Table-2, the power control command 001010 may correspond to a power setting of 8 ampere and 12 volts. Similarly, the power control command 010010 may correspond to a power setting of 10 ampere and 12 volts. Further, the power control command 100010 may correspond to a power setting of 12 ampere and 12 volts. It may be noted that, for illustration purposes, Table-3 is shown to include the power control commands corresponding to the power settings shown in Table-2. In some examples, the number of bits in the power control command may be chosen based on number current and voltage magnitudes producible by the voltage regulator 120. By way of example, each of the power control commands shown in Table-3, includes six bits where the first three bits corresponds to a current magnitude and the last three bits corresponds to the voltage magnitude. For instance, in the power control command 001010, the first three bits 001 may indicate that a current of 8 A magnitude is to be produced and the last three bits 010 may indicate that a voltage of 12 V magnitude is to be produced. It may be noted that, power control commands represented in Table-3 are for illustration purposes. Power control commands may also be produced in a different manner and may have different number of bits and/or different sequences of the bits, without limiting the scope of the present disclosure. Moreover, the second look-up table 130 may also have more or lower number of power demand codes than depicted.

During operation, once the power setting is determined, the processing resource 122 may access the second look-up table 130 and select the power control command based on the second mapping stored in the second look-up table 130 and the identified power setting. For example, for the given host circuit board, if the power setting is 8 A and 12 V, the processing resource 122 may select the power control command corresponding to the given circuit board as being 001010. Although the first look-up table 128 and the second look-up table 130 are shown as separately stored in the machine-readable medium 124, in some other examples, the first look-up table 128 and the second look-up table 130 may be combined into a common look-up table.

Further, the processing resource 122 may transmit the determined power control command to the voltage regulator 120. In some examples, the processing resource 122 may transmit the determined power control command to the voltage regulator 120 over a serial communication link (e.g., I2C bus) between the control unit 118 and the voltage regulator 120. In some examples, the VR controller in the voltage regulator 120 may receive the power control command. The VR controller in the voltage regulator 120 may decode the power control command and control the power converters in the voltage regulator 120 to generate the electrical power at the power setting corresponding to the received power control command. Description of the decoding of the power control command by the VR controller and the control of the power converters by the VR controller is beyond the scope of the present disclosure.

As illustrated hereinabove, the modular power supply unit 100 is capable of generating the electrical power that suits the power demand of the host circuit board. This is achieved, at least partially, by designing the output connector 102 to have the ID pins 106-110 through which the control unit 118 senses the power demand of a host circuit board and determines a power demand code corresponding to the host circuit board. Based on the determined power demand code, the control unit 118 instructs the voltage regulator 120 to generate the electrical power at a power setting that matches the power demand of the host circuit board. As will be appreciated, such modular power supply unit 100 can be removably connected to different host circuit boards that may require different power for respective operations. By detecting the power demand of connected host circuit board, the modular power supply unit 100 may dynamically generate the electrical power at a power setting corresponding to the power demand of the connected host circuit board. Moreover, since the modular power supply unit 100 is removable from the host circuit board, the modular power supply unit 100 can be detached from the host circuit board at any given time and can be removably connected to another host circuit board. As will be appreciated, the modular power supply unit 100 may be reused with other host circuit boards in the event that there is any malfunction, failure, or damage to the host circuit board to which the modular power supply unit 100 was earlier connected.

Figure 2:
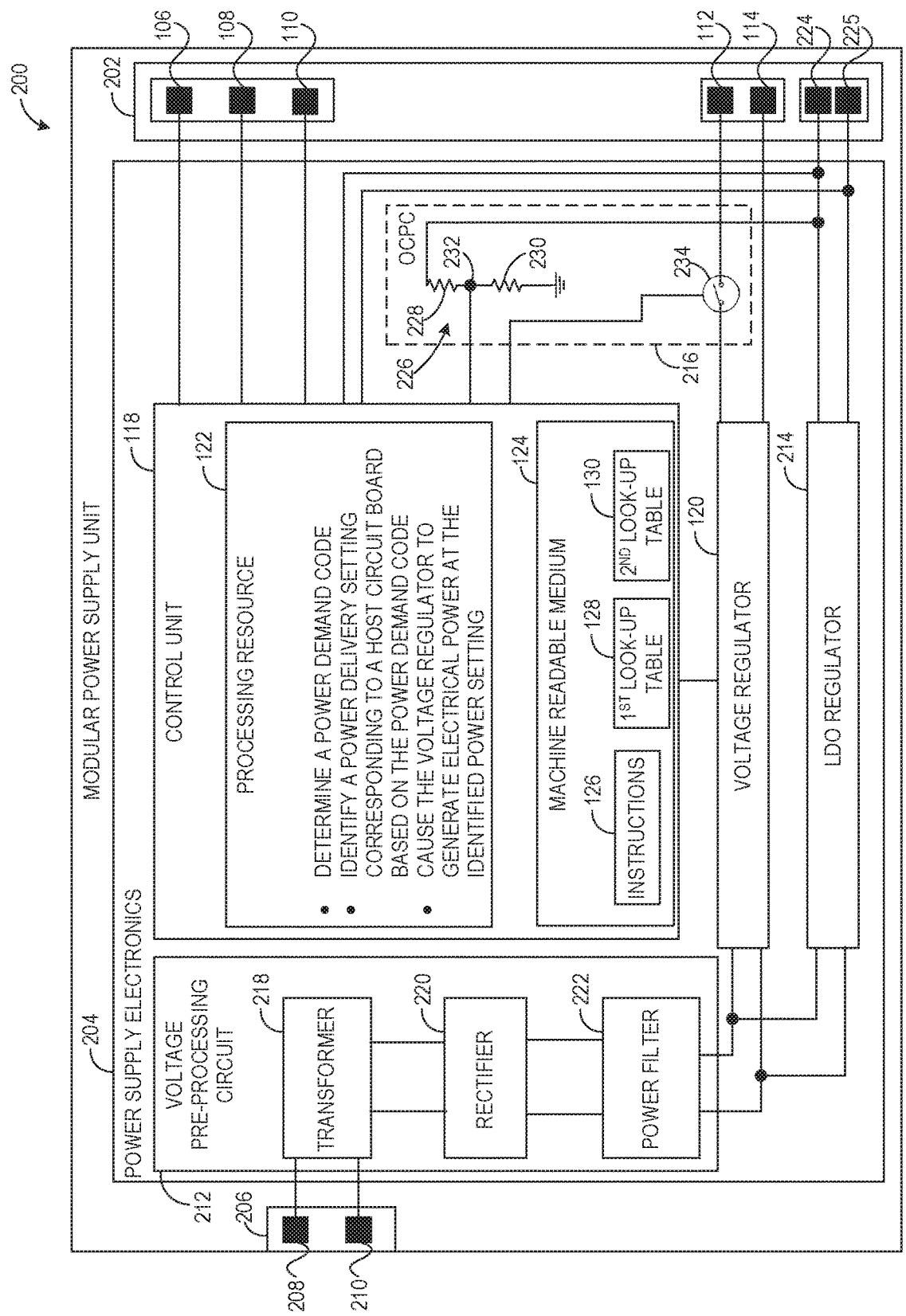
FIG. 2 depicts a block diagram of a modular power supply unit, in accordance with another example.

Turning now to FIG. 2, a block diagram of a modular power supply unit 200 is presented, in accordance with another example. The modular power supply unit 200 of FIG. 2 may be representative of one example of the modular power supply unit 100 of FIG. 1 and is similar in many aspects with the modular power supply unit 100. Further, the modular power supply unit 200 may include several components that are similar to corresponding components of the modular power supply unit 100, description, e.g., structural and functional details of which is not repeated herein. Therefore, for ease of illustration, these components have been referenced using the same reference numerals as used in FIG. 1.

By way of example, the modular power supply unit 200 is shown to include an output connector 202, a power supply electronics 204, and an input connector 206. The input connector 206 may include input power terminals 208 and 210 through which the modular power supply unit 200 may receive mains power or utility electricity. The power supply electronics 204 may be electrically coupled to the input power connector 206 to receive the mains power. The power supply electronics 204 may include the control unit 118, the voltage regulator 120, a voltage pre-processing circuit 212, a low dropout (LDO) regulator 214, and an overcurrent protection circuit (OCPC) 216.

The voltage pre-preprocessing circuit 212 may include an electronic circuit to convert the mains power received from the input power connector 206 into a DC power. For example, the voltage pre-preprocessing circuit 212 may include a transformer 218, a rectifier 220, and a power filter 222. The transformer 218 may provide an electrical isolation to the power supply electronics 204 from the input power terminals 208, 210 and may aid in stepping-down supply voltage to a reduced voltage level. Further, the rectifier 220 may be coupled to the transformer 218 to receive the stepped-down AC voltage from the transformer 218. The rectifier 220 may convert the received AC voltage (e.g., the stepped-down AC voltage) into a DC voltage. The rectifier 220 may be a full-wave rectifier or a half-wave rectifier that is implemented using circuit of diodes or an integrated circuit.

Further, the power filter 222 may be coupled to the rectifier 220 to receive the DC voltage from the rectifier 220. The power filter 222 may remove ripples from the incoming DC voltage thereby outputting a filtered DC voltage with the reduced ripples/distortions. The power filter may be implemented using one or more of inductors and capacitors. Accordingly, the voltage pre-preprocessing circuit 212 may output the DC power at a predetermined voltage suitable to be received by the voltage regulator 120 and the LDO regulator 214. Specifications of electronic components within the voltage pre-preprocessing circuit 212 may be chosen such that the voltage pre-preprocessing circuit 212 can output the DC power having the predetermined voltage. The predetermined voltage may be selected such that the voltage regulator 120 can generate the electrical power at the plurality of the power setting, described hereinabove.

The LDO regulator 214 may be similar to the voltage regular 120, however, is designed to generate DC voltage at a reduced voltage level in comparison to an output of the voltage regulator 120. In one example, the LDO regulator 214 may also include one or more power converters capable of generating such reduced voltage that may be available at low-voltage output terminals 224 and 225 of the output connector 202. By way of example, the low-voltage output terminals 224 may be maintained at a positive potential and the low-voltage output terminals 225 may be maintained at a negative potential. In some examples, the control unit 118 may be powered via the low-voltage generated by the LDO regulator 214. In addition, in some examples, the low-voltage output generated by the LDO regulator 214 may also be supplied to the host circuit board via the output connector 202 to power certain low-voltage electronics disposed on the host circuit board.

Moreover, in certain instances, when the modular power supply unit 200 is turned-on, due to certain internal capacitances within the modular power supply unit 200, there may be a chance of excessive current being supplied to the host circuit board. In order to prevent any malfunction or damage to the host circuit board that may be caused due to an overcurrent, the power supply electronics 204 includes the OCPC 216. The OCPC 216 may be coupled to the voltage regulator 120, the LDO 214, and the control unit 118. In particular, the OCPC 216 may be coupled to the output terminals 112, 114 and the low-voltage output terminals 224 and 225.

In some examples, the OCPC 216 may include voltage divider circuit 226 coupled to the LDO 214 and the control unit 118. In the example of FIG. 2, the voltage divider circuit 226 is shown as formed using resistors 228 and 230. In particular, in the voltage divider circuit 226, one terminal of the resistor 228 is electrically connected to one of the low-voltage output terminal, for example, the low-voltage output terminal 224 and the other terminal of the resistor 228 is coupled to one terminal of the resistor 230. Another terminal of the resistor 230 is grounded. Further, an interconnection terminal 232 of the resistors 228 and 230 is electrically connected to the control unit 118. Although the voltage divider circuit 226 is shown as formed using two resistors 228, 230 in FIG. 2, use of more than two resistors to form such voltage divider circuit is also envisioned within the purview of the present disclosure.

Moreover, the OCPC 216 may include a current limiter switch 234 coupled to at least one of the output voltage terminals 112, 114 and the control unit 118. In the example of FIG. 2, the current limiter switch 234 is shown as connected between an output of the voltage regulator 120 and the output terminal 112. The current limiter switch 234 may be an electronic switch (e.g., semiconductor switch) that can be operated in an ON-state (i.e., conducting state) and an OFF-state (i.e., non-conducting state). An example of the current limiter switch 234 may be a MOSFET. The current limiter switch 234 when operated in the ON-state, allows a current to flow there-through. Further, the current limiter switch 234 when operated in the OFF-state, blocks a flow of the current there-through.

By default, the control unit 118 may operate the current limiter switch 234 in the OFF-state. Accordingly, immediately upon when the modular power supply unit 200 is turned-on (i.e., the modular power supply unit 200 starts receiving the mains power), the host circuit board may not receive any current as the current limiter switch 234 blocks the flow of the current when operated in the OFF-state. As soon as the modular power supply unit 200 starts receiving the mains power, the voltage at the low-voltage output terminal 224 may gradually build-up (i.e., starts increasing). Consequently, a voltage at the interconnection terminal 232 may also increase with an increase in the voltage at the low-voltage output terminal 222. Once the voltage at the interconnection terminal 232 reaches a threshold voltage, the processing resource 122 may send a control signal to the current limiter switch 234 to operate the current limiter switch 234 in the ON-state. Once the current limiter switch 234 is operated in the ON-state, the host circuit board may start receiving the electrical power from the output connector 202 at the identified power setting corresponding to the host circuit board.

As will be appreciated, the modular power supply unit 200 may also be capable of generating the electrical power that suits a power demand of the host circuit board due to the similar reasons described with reference to the modular power supply unit 100. Further, similar to the modular power supply unit 100, the modular power supply unit 200 may also be detached from the host circuit board at any given time and can be removably connected to another host circuit board. As will be appreciated, the modular power supply unit 100 may be reused with other host circuit boards. In addition, due to the use of the OCPC 216, the modular power supply unit 200 may also prevent supply of overcurrent to the host circuit board.

Figure 3:
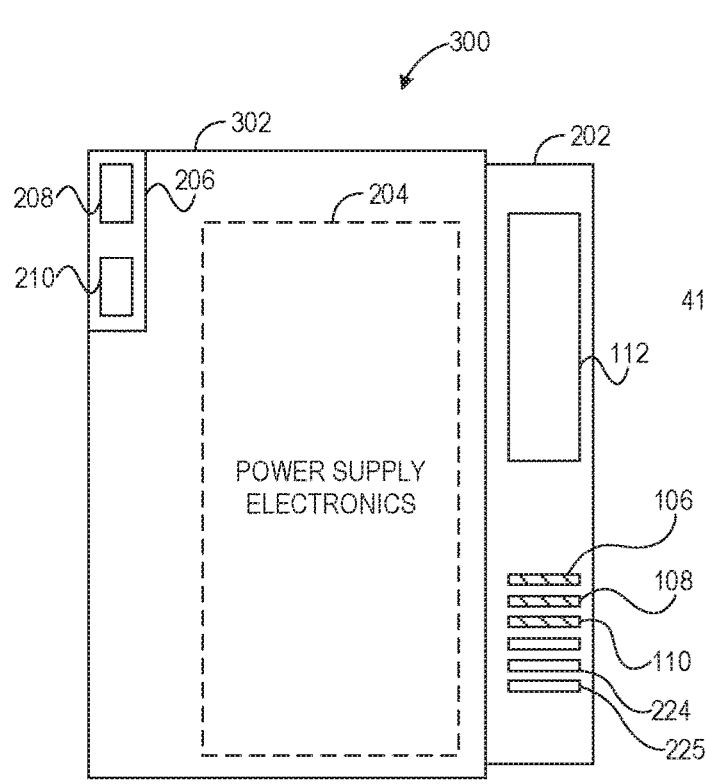
FIG. 3 depicts a diagrammatic representation of a top-view of a modular power supply unit, in accordance with an another example.

Referring now to FIG. 3, a diagrammatic representation of a top-view 300 of a modular power supply unit 200 is presented, in accordance with an example. As depicted in the diagrammatic representation of the top-view 300, the modular power supply unit 200 may include a circuit board 302 on which the power supply electronics 204 may be disposed. Further, the circuit board 302 may also be connected to the output connector 202. The circuit board 302 may include electrical paths for electrically connecting the output connector 202 with the power supply electronics 204. Moreover, the circuit board 302 may also include input power connector 206 to receive mains power. As depicted in the top-view 300 and as previously described, the output connector 202 includes various terminals, including but not limited to, the output terminals 112, 114, the one or more ID pins 106-110, and the low-voltage output terminals 224, 225. The output terminal 114 is not visible in the top-view as the output terminal 114 is positioned on a backside of the circuit board 302. It may be noted that positioning of the terminals and/or pins in the output connector 202 depicted in FIG. 3 is for illustration purposes. The terminals and/or pins in the output connector 202 may also be positioned in different arrangements without limiting the scope of the present disclosure.

Figure 4:
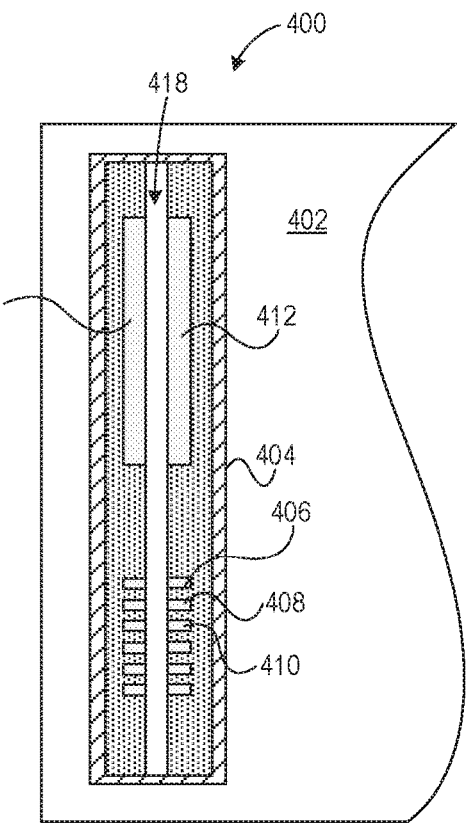
FIG. 4 depicts a diagrammatic representation of a top-view of a host circuit board, in accordance with an example.

Further, in FIG. 4, a diagrammatic representation of a top-view 400 of a host circuit board 402 is depicted, in accordance with an example. The host circuit board 402 may form a part of any electronic/computing system and host several electronic components that may impart various functionalities for the computing system. In some examples, the host circuit board 402 may include a receiving connector 404 that is removably connectible to the output connector 102 (or 202) of the power supply unit 100 (or 200). The receiving connector 404 may include one or more power demand indication (PDI) pins 406, 408, and 410 that are connectible to the ID pins 106, 108, and 110, respectively, of the output connector 102, 202. The host circuit board 402 may cause a signal to appear on one or more of the PDI pins 406, 408, and 410. The signals on the PDI pins 406, 408, and 410 may be indicative of a power requirement of the host circuit board. The signal appearing at each of the PDI pins 406, 408, and 410 may be a voltage signal or a current signal, as described hereinabove. Further, the receiving connector 404 may also include incoming power terminals 412 and 414.

During application, the modular power supply unit 100 or 200 is connected to the host circuit board 402. In one example, to effect such connection, the output connector 102 or 202 may be inserted into a slot 418 in the receiving connector 404. Once inserted, the each of the ID pins 106-110 may be in electrical contact with the respective ones of the PDI pins 406-410 of the receiving connector 404. Accordingly, the ID pins 106-110 may receive signals (e.g., DC voltages) indicative of the power demand corresponding to the host circuit board 402. Further, when the output connector 102 or 202 may be inserted into the slot 418, the incoming power terminals 412 and 414 may also come in electrical contact with the output terminals 112 and 114, respectively, to receive the electrical power from the modular power supply unit 100 or 200.

Figure 5:
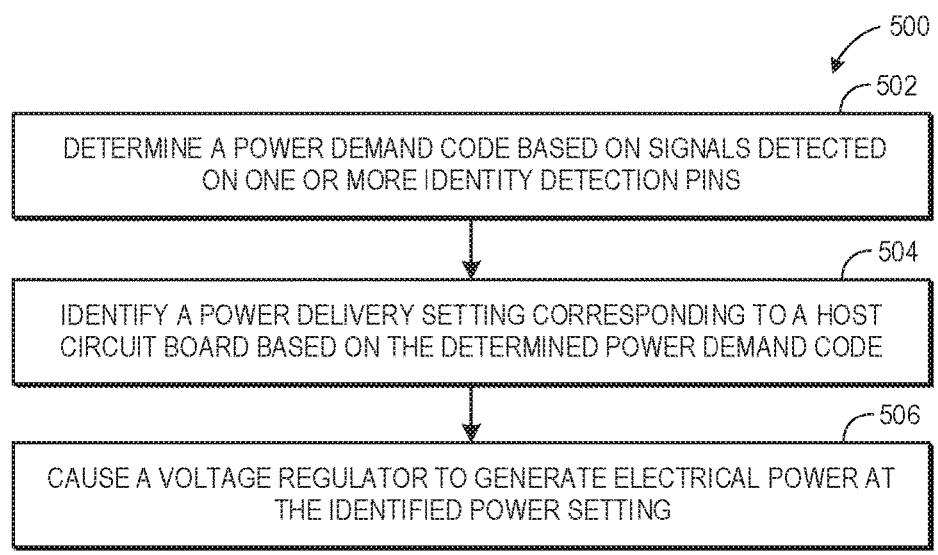
FIG. 5 is a flow diagram depicting a method for generating an electrical power for a given host circuit board by a modular power supply unit, in accordance with an example.

Turning now to FIG. 5, a flow diagram depicting a method 500 for generating an electrical power for a given host circuit board (e.g., the host circuit board 402) is presented, in accordance with an example. For illustration purposes, the method 500 will be described in conjunction with the modular power supply unit 100 of FIG. 1. As will be appreciated, the method 500 may also be applicable to the modular power supply unit 200 of FIG. 2, without limiting the scope of the present disclosure. The method 500 may include method blocks 502, 504, and 506 that may be performed by a processor-based system, for example, the control unit 118. In particular, operations at the method blocks 502, 504, and 506 may be performed by the processing resource 122 of the control unit 118 by executing the instructions 126 stored in the machine-readable medium 124.

At block 502, the control unit 118 may determine a power demand code based on the signals received at the one or more ID pins 106-110. The power demand code may be indicative of a power requirement of the host circuit board to which the modular power supply unit 100 is removably connected. In some examples, as described earlier in FIG. 1, the processing resource 122 of the control unit 118 may determine the power demand code based on magnitudes of the voltages at the ID pins 106-110 and a threshold value. Further, at block 504, the control unit 118 may identify a power setting, from a plurality of power settings, corresponding to the host circuit board based on the determined power demand code. In some examples, in order to identify the power setting, the control unit 118 may maintain the first mapping (see Table-2) between a plurality of power demand codes and the plurality of power settings. Once the power demand code is determined, the processing resource 122 may access the first look-up table 128 and identify the power setting corresponding to the determined power demand code. Furthermore, at block 506, the control unit 118 may cause the voltage regulator 120 to generate the electrical power at the identified power setting by transmitting a power control command corresponding to the identified power setting.

Figure 6:
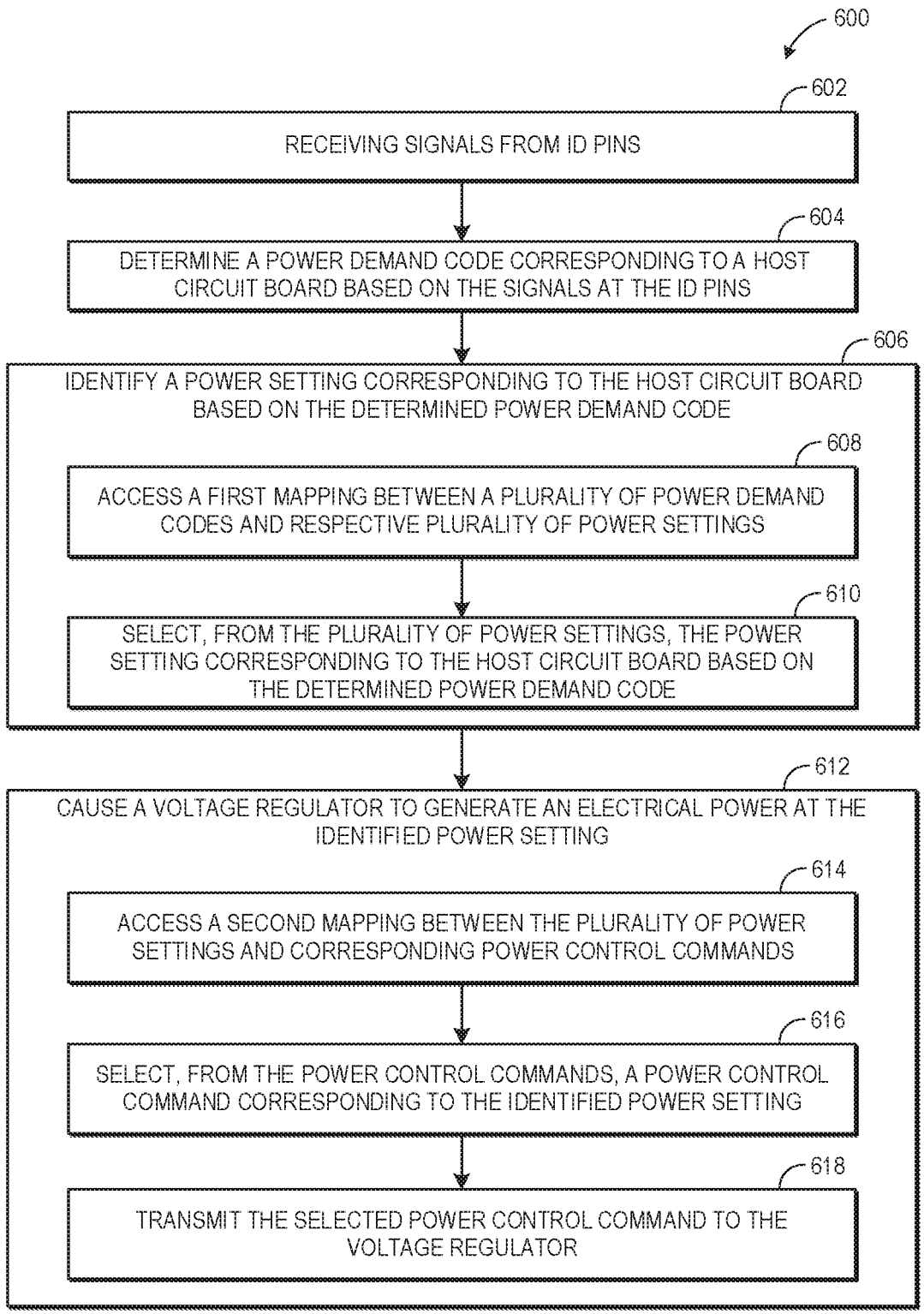
FIG. 6 is a flow diagram depicting a method for generating an electrical power for a given host circuit board by a modular power supply unit, in accordance with another example.

Referring now to FIG. 6, a flow diagram depicting a method 600 for generating an electrical power for a given host circuit board is presented, in accordance with an example. For illustration purposes, the method 600 will be described in conjunction with the modular power supply unit 100 of FIG. 1. As will be appreciated the method 500 may also be applicable to the modular power supply unit 200 of FIG. 2, without limiting the scope of the present disclosure. In particular, the method 600 may include sub-blocks for some of the method blocks of FIG. 5. The method 600 may include method blocks 602, 604, 606, 608, 610, 612, 614, 616, and 618 (hereinafter collectively referred to as 602-618) that may be performed by a processor-based system, for example, the control unit 118. In particular, operations at the method blocks 602-618 may be performed by the processing resource 122 of the control unit 118 by executing the instructions 126 stored in the machine-readable medium 124.

At block 602, the control unit 118 may receive signals from the ID pins 106-110. In some examples, the processing resource 122 in the control unit 118 may receive the voltage appearing at the ID pins 106-110. As describes earlier, the signals appearing at the ID pins 106-110 may be set by the host circuit board on its PDI pins. Further, at block 604, the control unit 118 may determine the power demand code corresponding the host circuit board based on the signals appearing at the ID pins 106-110 in a similar fashion as described in FIG. 1. Furthermore, at block 606, the control unit 118 may identify a power setting, from the plurality of power settings, corresponding to the host circuit board based on the determined power demand code. In some examples, the identification of the power setting at block 606 may include performing operations at method blocks 608 and 610. For example, at block 608, the processing resource 122 may access the first mapping between the plurality of power demand codes and the plurality of power settings stored as the first look-up table 128 (see Table-2) in the machine-readable medium 124. Moreover, at block 610, the processing resource 122 may select, from the plurality of power settings, the power setting corresponding to the host circuit board based on the determined power demand code. For example, for a given host circuit board, if the power demand code is determined as 010, the processing resource 122 may identify the power setting corresponding to the given circuit board as being 8 A and 12 V.

Further, at block 612, the control unit 118 may cause the voltage regulator 120 to generate the electrical power at the identified power setting. In some examples, causing the voltage regulator 120 to generate the electrical power may include performing operations at method blocks 614, 616, and 618. For example, at block 614, the processing resource 122 may access the second mapping between the plurality of power settings and corresponding power control commands stored as the second look-up table 130 (see Table-3) in the machine-readable medium 124. Further, at block 616, the processing resource 122 may select, from the power control commands, a power control command corresponding to the identified power setting. For example, if the identified power setting is 8 A and 12 V, the processing resource may select 001010 as the power control command. Moreover, at block 618, the processing resource 122 may transmit the selected power control command to the voltage regulator 120. The voltage regulator 120 may in-turn generate the electrical power at the identified power setting.

Figure 7:
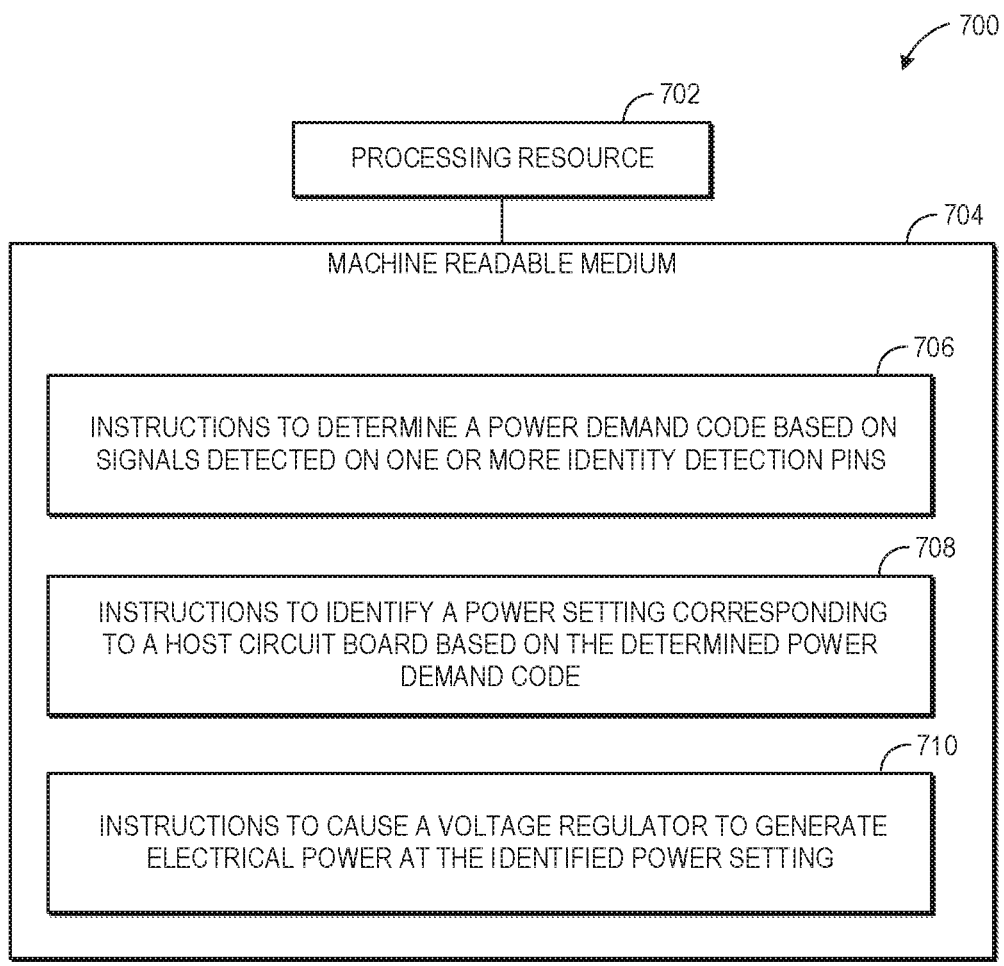
FIG. 7 is a block diagram depicting a processing resource and a machine-readable medium encoded with example instructions to generate an electrical power for a given host circuit board by a modular power supply unit, in accordance with an example.

FIG. 7 is a block diagram 700 depicting a processing resource 702 and a machine-readable medium 704 encoded with example instructions to generate an electrical power for a given host circuit board by a modular power supply unit 100, in accordance with an example. The block diagram 700 may represent the control unit 118 of FIG. 1, in one example. The processing resource 702 and the machine-readable medium 704 of FIG. 7 are similar in many aspects (e.g., types and structural details) with the processing resource 122 and the machine-readable medium 124 of FIG. 1, details of which are not repeated herein. The machine-readable medium 704 may store instructions 706, 708, and 710 that may be accessed and executed by the processing resource 702. The instructions 706, 708, and 710 may be representative of one example of the instructions 126.

The instructions 706 when executed by the processing resource 702 may cause the processing resource 702 to determine a power demand code based on the signals received at the one or more ID pins 106-110. Further, instructions 708 when executed by the processing resource 702 may cause the processing resource 702 to identify a power setting, from the plurality of power settings, corresponding to the host circuit board based on the determined power demand code. In some examples, the instructions 708 may include instructions which when executed by the processing resource 122 may cause the processing resource 122 to access the first mapping from the first look-up table 128. Furthermore, the instructions 708 may include instructions which when executed by the processing resource 122 may cause the processing resource 122 select the power setting corresponding to the host circuit board based on the determined power demand code.

Moreover, the instructions 710 when executed by the processing resource 702 may cause the processing resource 702 to cause the voltage regulator 120 to generate the electrical power at the identified power setting. In some examples, the instructions 710 may include instructions which when executed by the processing resource 122 may cause the processing resource 122 to access the second mapping from the second look-up table 130. Furthermore, the instructions 708 may include instructions which when executed by the processing resource 122 may cause the processing resource 122 to select the power control command corresponding to the identified power setting. Moreover, the instructions 708 may include instructions which when executed by the processing resource 122 may cause the processing resource 122 instructions to transmit the selected power control command to the voltage regulator 120. Additional details regarding determination of the power demand code, identification of the power setting, and causing the voltage regulator 120 to generate the electrical power are described in conjunction with FIGS. 1, 5, and 6.

As will be appreciated, the modular power supply unit 100, 200 may be capable of generating the electrical power that suits a power demand of the host circuit board. Further, such modular power supply unit 100, 200 can be removably connected to different host circuit boards that may require different power for respective operations. By detecting the power demand of connected host circuit board, the modular power supply unit 100, 200 may dynamically generate the electrical power at a power setting corresponding to the power demand of the connected host circuit board. Moreover, since the modular power supply unit 100, 200 is removable from the host circuit board, the modular power supply unit 100 can be detached from the host circuit board at any given time and can be removably connected to another host circuit board. As will be appreciated, the modular power supply unit 100, 200 may be reused with other host circuit boards in the event that there is any malfunction, failure, or damage to the host circuit board. Additionally, in some examples, the modular power supply unit 100, 200 may include an overcurrent protection circuit that can prevent supply of overcurrent to the host circuit board, thereby protecting the host circuit board from any issue that may be caused due to an overcurrent flow.

While certain implementations have been shown and described above, various changes in form and details may be made. For example, some features and/or functions that have been described in relation to one implementation and/or process may be related to other implementations. In other words, processes, features, components, and/or properties described in relation to one implementation may be useful in other implementations. Furthermore, it should be appreciated that the systems and methods described herein may include various combinations and/or sub-combinations of the components and/or features of the different implementations described.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. A modular power supply unit comprising:
   an output connector through which the modular power supply unit is removably connectible to a host circuit board separate from the modular power supply, wherein the output connector comprises one or more identity detection (ID) pins to receive signals indicative of a power demand corresponding to the host circuit board;
   a voltage regulator to output an electrical power at a plurality of power settings; and
   a control unit coupled to the output connector and the voltage regulator, wherein the control unit is to:
      determine a power demand code based on the signals received at the one or more ID pins;
      identify a power setting, from the plurality of power settings, corresponding to the host circuit board based on the determined power demand code; and
      cause the voltage regulator to generate the electrical power at the identified power setting.

2. The modular power supply unit of claim 1, wherein the host circuit board comprises a receiving connector removably connectible to the output connector of the power supply unit, wherein the receiving connector comprises one or more power demand indication pins connectible to the one or more ID pins in the output connector.

3. The modular power supply unit of claim 1, wherein the signals comprise DC voltages, and wherein the control unit is to determine the power demand code based on a magnitude of the DC voltages of the signals detected on each of the one or more ID pins.

4. The modular power supply unit of claim 1, wherein the control unit is to maintain a first mapping between a plurality of power demand codes and the plurality of power settings.

5. The modular power supply unit of claim 1, wherein the control unit is to identify the power setting corresponding to the host circuit board based on the determined power demand code and the first mapping.

6. The modular power supply unit of claim 5, wherein the control unit is to maintain a second mapping between the plurality of power settings and corresponding power control commands.

7. The modular power supply unit of claim 6, wherein the control unit is to:
   select a power control command based on the second mapping and the identified power setting; and
   transmit the selected power control command to the voltage regulator.

8. The modular power supply unit of claim 7, wherein the control unit transmits the selected power control command to the voltage regulator via a serial communication link.

9. The modular power supply unit of claim 1, wherein the identified power setting comprises a voltage level, a current level, or both.

10. The modular power supply unit of claim 1, further comprising:
    output voltage terminals to supply the electrical power to the host circuit board; and
    an overcurrent protection circuit coupled to at least one of the output voltage terminals to protect the host circuit board from excessive current.

11. The modular power supply unit of claim 10, further comprising a low-drop-out (LDO) regulator to generate voltage at a level that is lower than voltage at the output voltage terminals.

12. The modular power supply unit of claim 11, wherein the overcurrent protection circuit comprises:
    a voltage divider circuit coupled to the LDO and the control unit; and
    a current limiter switch coupled to the at least one of the output voltage terminals and the control unit, wherein the control unit is to generate a control signal to operate the current limiter switch in a conducting state when a voltage at the voltage divider circuit reaches a predetermined level.

13. A method comprising:

determining, by a control unit disposed in a modular power supply unit connectible to a host circuit board via an output connector, a power demand code corresponding to the host circuit board based on signals detected on one or more ID pins of the output connector of the modular power supply unit;

identifying, by the control unit, a power setting, from a plurality of power settings, corresponding to the host circuit board based on the determined power demand code; and causing, by the control unit, the voltage regulator to generate the electrical power at the identified power setting.

14. The method of claim 13, wherein identifying the power setting comprises:

accessing a first mapping between a plurality of power demand codes and the plurality of power settings; and selecting, from the plurality of power settings, the power setting corresponding to the host circuit board based on the determined power demand code.

15. The method of claim 14, wherein causing the voltage regulator to generate the electrical power comprises:

accessing a second mapping between the plurality of power settings and corresponding power control commands; and selecting, from the power control commands, a power control command corresponding to the identified power setting.

16. The method of claim 15, further comprising transmitting the selected power control command to the voltage regulator.

17. A non-transitory machine-readable medium storing instructions executable by a control unit, the instructions comprising:

instructions to determine a power demand code corresponding to a host circuit board removably connected to a modular power supply unit based on signals received at one or more ID pins of an output connector of the modular power supply unit;

instructions to identify a power setting, from a plurality of power settings, corresponding to a host circuit board based on the determined power demand code; and instructions to cause a voltage regulator to generate the electrical power at the identified power setting.

18. The non-transitory machine-readable medium of claim 17, wherein the instructions to identify the power setting comprises:

instructions to access a first mapping between a plurality of power demand codes and the plurality of power settings; and instructions to select the power setting corresponding to the host circuit board based on the determined power demand code.

19. The non-transitory machine-readable medium of claim 18, wherein the instructions to cause the voltage regulator to generate the electrical power comprises:

instructions to access a second mapping between the plurality of power settings and corresponding power control commands; and instructions to select a power control command corresponding to the identified power setting.

20. The non-transitory machine-readable medium of claim 19, wherein the instructions to cause the voltage regulator to generate the electrical power further comprises instructions to transmit the selected power control command to the voltage regulator.

* * * * *